United States Patent [19]

Satzger et al.

[11] Patent Number: 5,570,186

[45] Date of Patent: Oct. 29, 1996

[54] METHOD FOR INSPECTING THE CURVATURE OF A PROFILE, SUCH AN EDGE OF A TURBINE BLADE

[75] Inventors: Wilhelm Satzger, Munich; Edmund Mangold, Ohlstadt, both of Germany

[73] Assignee: MTU Motoren- und Turbinen-Union Muenchen GmbH, Munich, Germany

[21] Appl. No.: 391,553

[22] Filed: Feb. 21, 1995

Related U.S. Application Data

[63] Continuation-in-part of Ser. No. 53,156, Apr. 27, 1993, Pat. No. 5,444,536.

[30] Foreign Application Priority Data

Apr. 28, 1992 [DE] Germany .................. 42 13 908.2

[51] Int. Cl.$^6$ .................................................. G01B 11/24
[52] U.S. Cl. .......................... 356/376; 356/445; 356/371; 250/559.22
[58] Field of Search ..................................... 356/375, 376, 356/445–448, 371; 250/559.22

[56] References Cited

U.S. PATENT DOCUMENTS

| | | | |
|---|---|---|---|
| 4,218,144 | 8/1980 | Whitehouse et al. ................... | 356/371 |
| 4,657,394 | 4/1987 | Halioua . | |
| 4,709,156 | 11/1987 | Murphy et al. . | |
| 5,003,187 | 3/1991 | Zumbrunn et al. . | |
| 5,067,817 | 11/1991 | Glenn . | |

FOREIGN PATENT DOCUMENTS

| | | |
|---|---|---|
| 0318249 | 5/1989 | European Pat. Off. . |
| 2412359 | 9/1975 | Germany . |
| 2620330 | 11/1976 | Germany . |
| 3817561 | 11/1989 | Germany . |
| 0250505 | 1/1986 | Japan . |

OTHER PUBLICATIONS

Numerical Recipes in C by William H. Press et al. Cambridge University Press, 1988, pp. 566–583.

*Primary Examiner*—K. Hantis
*Attorney, Agent, or Firm*—W. G. Fasse; W. F. Fasse

[57] ABSTRACT

The curvature of an edge such as the trailing edge of a turbine blade having a specular reflection surface is inspected by illuminating the surface area to be measured with a laser beam and sensing the reflected laser light. The laser beam intensity across the cross-section of the laser beam is varied by a radiation intensity matrix located between the laser beam generator and the edge to be sensed or measured, whereby local radiation intensity variations are provided in the form of illuminating laser beam segments (A, B, C, . . . ) having different intensities. The beam reflected segments (A', B', C', . . . ) have a reflection angle that is equal to the incidence angle of the respective illuminating laser beam segments (A, B, C, . . . ). This fact is used for the correlation (A, A'; B, B'; C, C', . . . ). The reflected beam segments (A', B', C', . . . ) are scanned in a line-by-line fashion whereby the radiation intensity values varying along the curvature are measured. The measured values are then processed in a central processing unit for producing the curvature profile. The method can be used especially for measuring sharp edges, such as knife edges, cutting tool edges, or turbine blade edges and the like. The illumination is direct without any optical components between the matrix and the surface to be inspected.

14 Claims, 2 Drawing Sheets

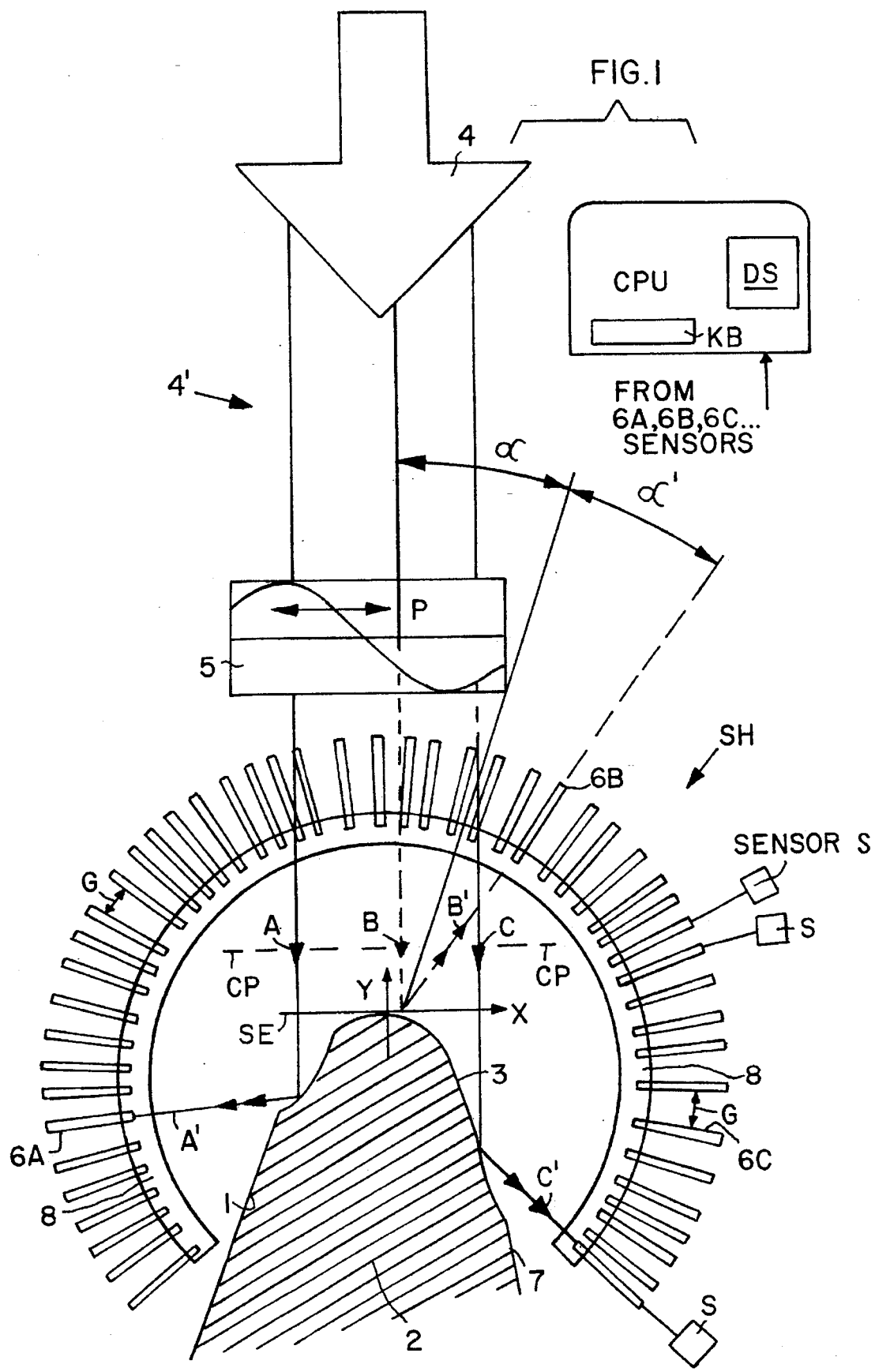

FIG. 2

```
START MEASURING
RESULT: N LINE IMAGES
```
↓
```
SUMMING THE LINE IMAGES TO FORM A RESPECTIVE NUMBER N OF
INTENSITY IMAGES. AVERAGING OVER A NUMBER OF PIXELS E.G.
124 TO 152 ALLOCATED TO LIGHT CONDUCTOR 19
RESULT: N INTENSITY IMAGES
```
↓
```
CALCULATING A PHASE IMAGE BASED ON THE N INTENSITY IMAGES
RESULT: PHASE IMAGE
```
↓
```
DEMODULATING TO ELIMINATE AMBIGUITY IN THE PHASE IMAGE
RESULT: DEMODULATED PHASE IMAGE
```
↓
```
ASCERTAINING IN THE LIGHT BAND THE DEMODULATED PHASE OF THE
LIGHT BEAM SCATTERED BACK BY 180°, AND CORRELATING THE POINT
OF ILLUMINATION x0 ON THE x-AXIS COORDINATE, WHEREBY x0=0.0
IS THE COORDINATE OF A HORIZONTAL TANGENT TO THE EDGE PRO-
FILE 3
RESULT: x0=0.0 STARTING VALUES
```
↓
```
CORRELATION OF THE POINT OF ILLUMINATION x OF A BEAM TO
THAT LIGHT CONDUCTOR INTO WHICH THE RESPECTIVE BEAM HAS
BEEN REFLECTED. THE x- AND y-COORDINATES OF THE LIGHT
ENTRANCE SURFACES OF THE RESPECTIVE LIGHT CONDUCTOR ARE
KNOWN. THUS, EACH REFLECTED BEAM CAN BE CORRELATED TO:
(A)  THE POINT x OF ILLUMINATION ON THE PROFILE 3
(B)  x-COORDINATE OF THE LIGHT ENTRANCE SURFACE $M_1$
(C)  y-COORDINATE OF THE LIGHT ENTRANCE SURFACE $M_2$
THUS, TWO FUNCTIONS $M_1(x)$ AND $M_2(x)$ ARE OBTAINED.
RESULT: $M_1(x)$, $M_2(x)$ (DEFLECTION VALUES)
```
↓
```
THE DEFLECTION VALUES DEFINE THE RIGHT-HAND SIDE OF AN
ORDINARY DIFFERENTIAL EQUATION OF THE FIRST ORDER FOR
THE EDGE PROFILE Y(x).
$Y'(x) = F(Y, M_1(x), M_2(x))$.
THE STARTING POINT (x0, 0.0) MAKES THE SOLUTION OF THE
EQUATION UNAMBIGUOUS. THE KNOWN NUMERICAL OPERATION FOR
SOLVING THE EQUATION US USED ACCORDING TO RUNGE-KUTTA.
RESULT: EDGE PROFILE Y(x)
```

METHOD FOR INSPECTING THE CURVATURE OF A PROFILE, SUCH AN EDGE OF A TURBINE BLADE

CROSS-REFERENCE TO RELATED APPLICATIONS

This is a continuation-in-part application of parent U.S. Ser. No. 08/053,156; filed Apr. 27, 1993. The present application also relates to U.S. Ser. No. : 08/053,020, filed Apr. 26, 1993, entitled APPARATUS FOR MEASURING THE CURVATURE OF A PROFILE, SUCH AS AN EDGE OF A TURBINE BLADE, now U.S. Pat. No. 5,444,536.

FIELD OF THE INVENTION

The invention relates to a method for inspecting the curvature of a profile providing a specular or mirror light reflection such as an edge of a turbine blade including leading and trailing blade edges and any other light reflecting edge, such as a cutting tool edge or a knife edge. The present method provides an efficient monitoring, for example, at a production line for checking the edge or profile quality of a metal product that is sufficiently polished to provide a specular light reflection as opposed to light diffusion. The inspection provides information regarding the profile quality, for example, the edge conformance to required standards including a required curvature without pitting or other damage to the edge.

BACKGROUND INFORMATION

U.S. Pat. No. 4,657,394 (Halioua), issued on Apr. 14, 1987, discloses an apparatus and method for measuring three-dimensional surface contours, whereby phase measurements are taken of deformed, two-dimensional grating images and these phase measurements are used to perform an improved optical profilometry. Individual line profiles are obtained at a series of rotational increments of a body. A full 300° surface profile or a portion thereof can be generated by illuminating the three-dimensional image from a grating projector combined with a phase shifter and the reflected light is received by a linear array camera which provides output signals to an analog-to-digital converter and to a central processing unit which in turn provides respective output signals to a display. Halioua relies on the diffusion of a laser beam by the curved surface to be measured. A very precise focussing is required especially where a sharp edge is to be inspected so that the edge is positioned exactly in the focal plane. Such exact positioning requires a substantial effort and expense of position adjustment devices. No use is made of the optical fact that in a specular reflection the incidence angle equals the reflection angle.

U.S. Pat. No. 4,709,156 (Murphy et al.), issued on Nov. 24, 1987, discloses a method and apparatus for inspecting a curved three-dimensional surface, for example, in the form of propulsion plant blades. Murphy et al. scan the surface with a laser beam and the beam reflected by the surface is received by a detector array or linear detector for ascertaining the curvature profile. The distance between locations at which the reflected light beams are focused on the linear detector corresponds to the distance at which points on the surface of the article are offset due to the curvature of the surface being scanned. This type of arrangement has the disadvantage that it cannot ascertain the quality of curvature profiles of sharp edges having curvature radii on the order of the cross-section of the illuminating laser beam. The Murphy et al. device is capable of scanning only slightly curved surfaces, for example, the surface of a blade or vane, but not the sharply curved edges of such a vane or blade, especially the trailing edge.

European Patent Publication 0,318,249 A2 (Penney et al.), published May 31, 1989, discloses a ranging system which provides a high speed read-out of a triangulation performed with the aid of a coded aperture light detector which provides a direct digital representation of the range or elevation of a surface spaced from the ranging device. A light spot reflected by the scanned surface is optically spread into a line segment so that it can be shared among a number of light detection channels. The line of light falls on a coded aperture in front of a segmented bundle of fiber optic conductors and the light transmitted by each light conductor is led to a separate photomultiplier or solid state detector. Every coded channel is constructed to give one bit of the digital address of the range position and a reference light value is obtained from another channel. Background reflections and secondary reflections are filtered out by focusing light scattered from the surface to a spot and passing it through a slit aperture oriented in the plane of triangulation before being spread to a line segment. Such a device is primarily used in a three-dimensional camera.

German Patent Publication (DE-OS) 2,412,359 (Baerwinkel et al.), published on Sep. 25, 1975, discloses a method and apparatus for the contactless measuring or surveying of object contours. The object is illuminated with coherent light from two point-shaped light sources to form a three-dimensional interference field which in turn produces on the object being scanned an optical interference strip pattern that in turn is imaged onto an image plane by a central projection. An interference strip pattern is produced on a reference plane having at least three points with a known position. The data of the optical arrangement of the light sources, the imaging optic, and the image plane, are ascertained from the interference strip pattern from the imaging of said pattern and from the image of the known points. A non-expanded laser beam extending in the direction of the central vertical on a line connecting the two light sources marks the interference of null order. A computer calculates the position in space of the corresponding object points and thus the object contour on the basis of the coordinate of the image points and on the basis of the corresponding interference orders. Here again, very sharp contours cannot be imaged.

German Patent Publication (DE-OS) 2,620,330 (Hockley), published on Nov. 18, 1976, discloses a method and apparatus for determining a surface configuration. The Hockley apparatus includes an illuminating device which illuminates the surface to be measured or ascertained with an image. The image comprises straight parallel lines or strips that are light and dark so that a corresponding pattern is formed on the surface of the object. The configuration of the object surface distorts the pattern. A scanner and transducer scans the distorted pattern in order to follow a path along the surface and to produce a respective electrical output signal which indicates the variations in the surface illumination along the scanned paths, whereby these illumination changes are caused by the distortion of the strip pattern. Here again, there is room for improvement regarding the inspecting of sharp edges.

German Patent Publication (DE-OS) 3,817,561 (Berger et al.), published on Nov. 30, 1989, discloses an apparatus for projecting an object grid pattern used for making topographic measurements on an object to be tested. The Berger et al. apparatus makes use of the "projection-Moiré-method". For this purpose a laser projects its light onto a two-beam interferometer having two mirrors and a beam divider. At least one of the mirrors is a mirror arrangement for producing curved wave fronts. One of the mirrors is a fixed spherical mirror and the other is an adjustable spherical mirror. A transversal displacement of the adjustable mirror makes it possible to adjust the grid constant of the object grid pattern. An axial displacement of the adjustable mirror provides for an adjustment of the phase position of the object grid pattern.

U.S. Pat. No. 5,003,187 (Zumbrunn et al.), issued on Mar. 26, 1991, discloses a method and apparatus for surveying the surface of an object by projecting fringe patterns whereby gratings with linear line patterns are used. The line patterns have different periods and are successively projected onto the surface being surveyed. A television camera detects images of the line patterns as deformed by the surface being surveyed. The deformed images or their phase positions relative to a reference plane are stored and evaluated by an electronic circuit. The distortions of the line patterns are computed to provide information of absolute heights of points relative to the reference plane. Zumbrunn et al. direct a beam of light having a periodically varying intensity pattern over the beam cross-section, at the surface to be inspected. Defined phase positions yield residual phase values from which the heights of points on the inspected surface relative to the reference plane are Calculated. Zumbrunn et al. require diffused reflection and do not use specular or mirror reflection. Besides, a single measurement requires a plurality of line pattern projections each having a different period. These features of Zumbrunn et al. can be realized only with a substantial effort and expense for optics, etc.

U.S. Pat. No. 5,067,817 (Glenn), issued on Nov. 26, 1991, discloses a method and apparatus for measuring of the curvature and profile of a reflective test surface. The slope is measured by simultaneously evaluating two closely spaced points on the test surface by directing two parallel, nearly collimated light beams, which are slightly displaced relative to each other and of opposite linear polarization onto the surface to be tested. The laser beam used must have a beam cross-section substantially smaller than the surface area to be measured. Glenn also relies on diffused reflection and his system components, especially the optics, are rather involved.

OBJECTS OF THE INVENTION

In view of the above it is the aim of the invention to achieve the following objects singly or in combination:

to provide a method for inspecting and monitoring the quality of metal edges that reflect light in a specular manner, even sharp edges such as may occur for example along the trailing edge of a turbine blade;

to provide a method that is capable of sensing a radius of curvature that is as small or even smaller than the cross-section of the laser beam used for the scanning of the sharp specularly light reflecting metal edge;

to provide a method of the type described that can be implemented by a compact scanning head;

to perform the measurement or rather the visual inspection by using a single laser beam that is specularly reflected only once by the surface area to be inspected to avoid repeated line pattern projections;

to mark individual, different beam segments in the same cross-sectional plane of the illuminating laser beam so that a single illumination is sufficient for an inspection to thereby avoid a repeated projection of line patterns;

to provide for a line-by-line laser beam inspection of a specularly reflecting edge or curvature, whereby a single illuminating laser beam having differently marked laser beam segments generates reflected laser beam segments simultaneously along a line that is, for example, a sector part of a circular line;

to avoid the use of optical components such as lenses, grids, etc., yet provide a contactless inspection of a specularly reflecting surface;

to measure the slope of a curved surface such as a turbine blade edge by taking advantage of the optical fact that the angle of incidence and the angle of reflection are equal to each other where specular reflection is involved; and to make even microscopic faults on the edge of a tool, e.g. a turbine blade, accessible for inspection.

SUMMARY OF THE INVENTION

The above objects have been achieved according to the invention by the combination of the following steps:

(a) generating a single laser beam having a plurality of parallel beam segments for illuminating at least a portion of a specular light reflecting surface;

(b) intensity modulating said parallel laser beam segments for marking different laser beam segments in the same cross-sectional plane of said laser beam to provide marked illuminating laser beam segments (A, B, C, . . . );

(c) directing said marked illuminating laser beam segments (A, B, C, . . . ) directly onto said specular light reflecting surface, whereby each marked illuminating laser beam segment (A, B, C, . . . ) has a respective incidence angle and represents a respective illuminating beam intensity value to produce reflected laser beam segments (A', B', C', . . . ) each having a reflection angle ($\alpha'$) that is equal to said incidence angle the corresponding illuminating laser beam segment (A, B, C, . . . );

(d) sensing or scanning said reflected laser beam segments (A', B', C', . . . ) to provide reflected beam intensity values;

(e) correlating said illuminating beam intensity values of said illuminating laser beam segments (A, B, C, . . . ), with reflected beam intensity values of said reflected laser beam segments (A', B', C', . . . ) to provide correlated values (A, A'; B, B'; C, C'); and (f) processing said correlated values with the aid of a computer program for ascertaining said curvature.

The main advantage of the method according to the invention is seen in that the curvature or profile of a specularly reflecting surface edge can be measured and tested directly simply by illuminating at least a portion of the profile even if the profile has a radius of curvature that is smaller than the beam cross-section of the illuminating laser beam. Another special advantage is seen in that even very sharp edges, such as knife edges or tool edges including turbine blade edges especially trailing blade edges, can be tested as to their quality to see, for example on a display screen, whether the turbine blade edge is pitted or otherwise worn.

The above mentioned intensity modulating of the parallel laser beam segments is preferably performed by a radiation intensity matrix which marks the parallel laser beam segments (A, B, C, ... ) in the same cross-section plane CP of the illuminating laser beam, whereby the laser beam segments have varying intensities downstream of the matrix. The beam with its marked segments can now directly illuminate the specular surface of the profile without any optical components. The marked laser beam segments (A, B, C, ... ) of the laser beam impinging on the light reflecting sharp metal edge of a structural component, are preferably marked by different laser beam segment intensities. Each marked incident beam segment (A, B, C, ... ) is reflected to provide a reflected beam segment (A', B', C'), ... at a reflection angle equal to its respective incidence angle. The reflected beam segments or rather their intensity is sensed by the above mentioned sensors. In order to establish a definite correlation between the illuminating or incident beam segments (A, B, C, ... ) and respective reflected beam segments (A', B', C', ... ), different radiation intensity values are allocated to the incident beam segments in said matrix and scanned in line-by-line fashion along the profile, whereby A is correlated to A', B to B', C to C', and so forth. Preferably, three different adjustments are made of the radiation intensity and the respective values are scanned, whereupon the profile is calculated on the basis of the scanned or measured values. The above mentioned sensors are preferably photosensitive sensors, such as photoresistors, photocells, or the like. The line-by-line scanning is accomplished by arranging the sensors along a line so that all sensors in a line sense simultaneously along that line which may be a circular line of a sector e.g. of 270°, for example. More specifically, the transmission in a line-by-line fashion, of the reflected laser beam segments is preferably accomplished through light conducting fibers, the ends of which fan out along a line in rows or arrays. The so arranged light conductor fiber ends are directed onto the profile in such a way that the reflected laser beam of a line, or rather of each line, is fully sensed or scanned. The opposite ends of these light conductor fibers feed their light signals into the photosensitive sensors which provide sensed or measured signals to the central processing unit for a graphical representation of the measured profile. Thus, optical systems are avoided, which is a very important advantage.

The calculation of the measured profile is accomplished by a computing program that uses a phase shifting algorithm. Such a program has the advantage of a rapid evaluation of the measured reflection values. According to the invention, a new differential equation is applied which takes parameters into account that represent measured, quantitative correlations between incident, illuminating beam segments (A, B, C, ... ) and the specularly reflected microscopic laser beam segments (A', B', C', ... ).

The laser beam intensity the laser beam segments or radiation intensity is varied across a cross-sectional plane of the beam, preferably by a transmission filter functioning as a radiation intensity matrix. The radiation intensity is advantageously adjusted by adjusting the transmission values of the transmission filter. The radiation intensity is locally fixed for one adjustment or for each adjustment of the transmission filter, namely, for each beam segment in the same cross-sectional plane. In order to adjust varying laser beam intensity values, it is necessary to locally displace the transmission filter. Such displacement, can for example be accomplished by an electromotoric, hydromechanical, or a pneumatic drive. An especially reliable and rapidly effective drive has been found in the use of a piezo-ceramic element as a driver which is particularly suitable for the rather minimal adjustments of the transmission filter that are necessary according to the invention. Such a piezo-ceramic element can make the necessary adjustments rapidly and precisely and these adjustments can be reliably repeated by a respective electronic control of the piezo-ceramic drive element.

In a preferred embodiment of the present method the radiation intensity matrix also referred to as the beam intensity matrix is formed by an interference between two partial beams of a laser beam that emits coherent light in the plane of the transmission matrix, whereby the laser beam intensity is modulated in accordance with a sinus function and whereby the differing intensity variations are obtained by the adjustment of semipermeable mirrors in the beam path of the partial beams. If, on the one hand, the angle between beam segments is varied by an angular adjustment of the mirror position, it is possible to correspondingly and advantageously vary the periodicity of the sinus function of the intensity matrix. On the other hand, if the spacing of a mirror of one of the beam segments coming from the semipermeable mirror is varied, the periodicity of the sinus function remains constant, but the position of the interference image relative to the laser beam cross-section is displaced. Such a spacing variation is used for adjusting the radiation intensity to different values for the beam segments across the same laser beam cross-section, whereby the linear adjustment of one of the mirrors is accomplished, preferably by a piezo-ceramic drive element.

According to a preferred embodiment for implementing the present method, the varying intensity values of the laser beam segments are adjusted so that the laser beam segment intensity varies over the cross-section at an angle to the longitudinal axis of the laser beam, whereby the angle may be a right angle or an angle less than a right angle. This type of adjustment provides an intensity distribution that rises or falls so that it becomes possible to determine in the most simple manner a microscopic beam segment (A, B, C, ... ) of the illuminating, incident laser beam that illuminates the metal edge or profile to be measured, and a corresponding reflected laser beam segment (A', B', C', ... ), whereby the correlation of the respective portions and thus of the profile to be measured is definitely determined.

In order to ascertain the curvature of a three-dimensional profile, it is preferred to scan the edge in a line-by-line manner. This may be done by either displacing the edge being measured or a scanning head with its laser beam in the direction of the third free axis of space. Whether to displace the edge or the scanning head will depend on the particular circumstances. It may be preferred to displace the laser beam emitted by the scanning head, because it may be simpler and more efficient to move the scanning head as compared to removing the edge to be measured out of a turbine. The movement of the scanning head is particularly simple when the scanning head is constructed as a compact head using a semiconductor laser or where the laser beam is transmitted through a flexible light conductor. In both instances the radiation intensity matrix can be formed on the basis of interference images as described above. Such a structure avoids removing the blade to be measured out of a turbine or the like which is a substantial advantage, especially in connection with blade edges installed in gas turbines. Such blade edges can now be measured without removal according to the invention to determine whether the blades are damaged, deformed, or otherwise not suitable for a further safe operation of the turbine. According to the invention any of these defects can be measured, regardless whether they have resulted from the operation of the turbine, or whether the turbine components had the defects already at the time of producing these components. The invention can make these tests without any substantial clamping and adjustment efforts for bringing the respective component to be tested into a particular position relative to the scanning head.

BRIEF DESCRIPTION OF THE DRAWINGS

In order that the invention may be clearly understood, it will now be described, by way of example, with reference to the accompanying drawings, wherein:

FIG. 1 illustrates schematically a circular scanning head for performing the present method including a central processing unit; and FIG. 2 is a flow diagram illustrating an operational sequence for performing the present method.

DETAILED DESCRIPTION OF PREFERRED EXAMPLE EMBODIMENTS AND OF THE BEST MODE OF THE INVENTION

Further details of the apparatus and of the several types of scanning heads are disclosed in the above mentioned application now U.S. Pat. No. 5,444,536 which is incorporated into the present disclosure by reference.

FIG. 1 illustrates the application of the method according to the invention for measuring the profile or curvature 1 of an edge 2 which is, for example, the trailing edge of a turbine blade. A specular blade area surface position 3 reflecting light as a mirror or specularly is to be measured or inspected. For this purpose, a laser beam generator 4 generates a laser beam 4', segments A, B, C, . . . of which are intensity modulated in a radiation intensity matrix 5 and directly applied to illuminate the surface area 3. The laser beam 4' is conducted through a bundle of light conductor fibers having ends 6, 6A, 6B, 6C, . . . facing the surface area 3. The ends 6, . . . of the light conductor fibers may be arranged to have a rectangular cross-section for a line-by-line illumination of the surface 7 of the profile 1.

According to the invention the intensity of parallel laser beam segments of the laser beam 4' is varied across the cross-section of the laser beam in the same cross-sectional plane CP. For example, the incoming microscopic beam segments A, B, C, . . . are varied by the matrix 5 through which the laser beam passes before the beam illuminates a specular surface portion 3 of a surface 7 of the profile 1. Each parallel beam segment A, B, C, . . . of the laser beam 4' is locally marked, e.g. by a different intensity. The marking of the beam segments A, B, C, . . . takes place preferably by a sinusoidal modulation in the matrix 5 as indicated by the sine curve. More specifically, the marking takes place by formation of an interference image, preferably with the aid of a modified Michelson interferometer as disclosed in the copending application, whereby the radiation intensity values are displaced in this example in accordance with a sine-shaped interference image by displacing the matrix back and forth in the direction of the double arrow P, e.g. by a piezo-electric drive.

The resulting different laser intensities of the parallel beam segments A, B, C, . . . are reflected by the specular surface portion 3 of the profile 1. The reflected beam segments A', B', C', . . . are scanned in a line-by-line manner along the profile 1 to measure the different radiation intensity values with sensors S, one of which is provided for each light conductor end 6. The signals obtained from the sensors S are then processed in a computer CPU, whereby first the light intensity signal values are converted into corresponding electrical signals which are preferably further converted into digital signals for computer processing and display as an enlarged image on a display screen DS for inspection.

A scanning head SH shown in FIG. 1 contains a plurality of light conductor fibers which form a bundle as mentioned above. Only the fiber ends 6 are shown in FIG. 1. The scanning head SH scans the reflected intensity modulated laser beam segments A', B', C', . . . . For this purpose the fiber ends 6 fan out radially from the center of a circle sector 8 that covers about 270°, leaving a sector of about 90° for encircling the profile 1 to be scanned. The fiber end 6A receives the reflected beam segment A'. The fiber end 6B receives the reflected beam segment B'. The fiber end 6C receives the reflected beam segment C'. These fiber ends 6A, 6B, 6C, . . . are connected through a fiber bundle not shown to the respective sensors S which in turn are connected to an input of a central processing unit CPU having a keyboard KB and a display screen DS. The CPU processes the signals from the fiber ends 6A, 6B, 6C, . . . in accordance with the flow diagram shown in FIG. 2.

Instead of the light conductor fiber ends 6, photosensitive elements arranged in circular arrays or video camera arrays may be used for the scanning. Further details of such scanning heads are described in the above mentioned application now U.S. Pat. No. 5,444,536.

Based on the dark values resulting from the interference image or based on the different laser beam segment intensities distributed over the cross-section of the laser beam, each microscopic laser beam segment A', B', C', . . . is as mentioned marked to represent the respective dark value or intensity value. Based on such markings and based on the fact that the reflection angle equals the incidence angle it is possible to correlate the illuminating beam segments A, B, C, . . . with the reflected marked beam segments A', B', C', . . . with the aid of a computer algorithm. These microscopic laser beam segments are paired or correlated A, A'; B, B'; C, C'; . . . based on the just stated fact that the incidence angle $\alpha$ and the reflection angle $\alpha'$ are equal to each other for each pair of beam segments A, A'; B, B'; C, C'; . . . . As a result, the quality of the surface 7 of the profile 1 can be positively determined and displayed on the display screen DS. In order to eliminate ambiguities, the interference image is displaced in the direction of the double arrow P and the scanning and measuring is repeated while the periodicity remains constant. The number of repeated scannings made by the operator will be sufficient to obtain satisfactory average mean values.

The array arrangement of the fanning out light conductor fiber ends 6 along an open ring 8 as mentioned above, can be replaced by a plurality of linear arrangements of fiber ends positioned around the profile surface 7 in groups or even a single linear array of fiber ends 6 can be used for the scanning. As shown in FIG. 1, the ring 8 is not completely filled with light conductor fiber ends 6, whereby gaps G appear between neighboring fiber ends to simplify the illustration. However, in practice there will be substantially no gaps between neighboring fiber ends 6, 6A, 6B, 6C, . . . in order to obtain a high resolution. For this purpose the fiber ends will be packed as closely as possible along a row or array arranged to permit scanning to the profile surface 7. If the diameter of the open ring 8 increases, so will the number of light conductor fiber ends positioned on the ring. Further, as described in the copending application, ring-shaped mirrors for deflecting the beams that were reflected by the specular metal surface portion 3 may also be used for a compact scanning head construction.

In the described example, the laser beam 4' has a radius of 250 μm and a diameter of half a millimeter or 500 μm in the cross-sectional plane CP. The profile surface 7 within this laser beam cross-section shows a convex portion at the tip and a concave portion left of the tip. All parts of the surface portion 3 are fully scanned in a contactless manner by the method of the invention. The open ring 8 has a diameter of 30 mm, and each light conductor fiber end 6 has a diameter of 30 µm. If a relative movement is established between the scanning head SH and the metal edge profile 1, the respective image can also be obtained in a three-dimensional spacial manner and displayed on the screen DS.

The above mentioned differential equation for measuring an edge profile is defined as follows:

For $x \neq m_1(x)$ (1)

$$\frac{dy}{dx}(x) \left\{ \frac{y - m_2(x) + \sqrt{[x - m_1(x)]^2 + [y - m_2(x)]^2}}{x - m_1(x)} \right\}$$

For $x = m_1(x) \rightarrow (x) = 0$ (2)

The foregoing differential equations are based on the rectangular coordinate system x-y shown in FIG. 1. The x-axis of this x-y coordinate system is positioned to tangentially contact the tip of the edge 2 to be scanned. Such positioning is also shown in FIG. 2 of the above mentioned application U.S. Ser. No.: 08/053,020, now U.S. Pat. No. 5,444,536. The y-axis of this coordinate system intersects the x-axis centrally through the edge 2 and where the x-axis is tangent to the surface portion 3 to be scanned. The y-axis extends in parallel to the direction of the laser beam 4' in FIG. 1. The third or z-axis is not shown but extends perpendicularly to the plane of the drawing sheet of FIG. 1 through the intersection of the x-axis with the y-axis.

In the above equations x represents the x-coordinate of the microscopic beam segments A, B, C, . . . , e.g. B in FIG. 1, more specifically x designates the x-coordinate of the point where the beam segment e.g. B impinges upon the profile of the surface area 3 of the edge 2. Similarly, y-represents the y-coordinate of the respective point of impingement. The function y(x) represents or describes the metal edge profile in the just mentioned x-y-coordinate system. The differentiation dy/dx (x) provides information regarding x at a particular position x.

For explaining the meaning of $m_1(x)$ and $m_2(x)$ reference is made to beam segment B, for example. When a beam segment B, is reflected at the profile of the surface area 3 the respective reflected and marked beam segment B' enters into the fiber end 6B of a light conductor. This fiber end 6B has the coordinates $m_1$ and $m_2$. The correlation of x to $m_1$ and x to $m_2$ is found with the aid of the respective beam segment B and the reflection thereof by surface 3. Specifically, the beams which are defined in their position by their x-coordinates and which are reflected by the profile surface 3, produce the two functions $x \rightarrow m_1(x)$ and $x \rightarrow m_2(x)$.

Referring to the flow diagram of FIG. 2 the terminology used with regard to the flow diagram is explained as follows:

N represents the number of line images obtained by phase shifting, for example N=4 phase shifts are made.

Light band represents the laser light that illuminates the blade edge 2.

Light beams are assumed to be parallel beams which together form the light band, each beam is identified by the phase shift operation or method. These are the beam segments A, B, C, . . . .

Point of illumination of a beam refers to the x-coordinate of that beam, whereby all beams or rather beam segments A, B, C, . . . extend in parallel to the y-axis of the rectangular coordinate system.

Scanning edge SE is a straight edge positioned inside the scanning head coinciding with the x-axis to limit the distance to which the blade edge 2 can enter into the scanning head.

Line image means a line comprising, for example, 1024 pixels in the camera used herein.

Intensity image means a line image comprising, for example 83 individual intensities, because the scanning head uses 83 individual light conductors.

Phase image means a line of, e.g. 83 elements. An individual phase is present for each element, whereby the individual phase was modulated onto the light band by phase modulation.

The flow diagram of FIG. 2 starts with the assumption that the blade edge 2 to be scanned or measured has been inserted into the scanning head SH, that the edge profile surface portion 3 contacts the scanning edge SE, and that a light band illuminates the profile 3 along a line. A calibration has been made, whereby it is known which phase difference corresponds to which location difference along the x-axis.

The explanations in the flow diagram do not require further comments, except that the numerical approximation technique according to Range-Kutta for solving differential equations is described in more detail in: Chapter 15.1, pages 569 and following of NUMERICAL RECIPES IN C by William H. Press et al., Cambridge University Press, 1988, which is incorporated by reference into the present disclosure.

Although the invention has been described with reference to specific example embodiments, it will be appreciated that it is intended to cover all modifications and equivalents within the scope of the appended claims.

What is claimed is:

1. A method for inspecting the curvature of a metal edge profile having a specular light reflecting surface, comprising the following steps:

(a) generating a single light beam having a plurality of parallel beam segments for illuminating at least a portion of said specular light reflecting surface;

(b) intensity modulating said parallel beam segments for marking different beam segments with a respective different beam segment intensity in the same cross-sectional plane of said light beam to provide marked illuminating beam segments (A, B, C, . . . ) each having a different intensity value;

(c) directing said marked illuminating beam segments (A, B, C, . . . ) from said single light beam directly onto said specular light reflecting surface, whereby each marked illuminating beam segment (A, B, C, . . . ) has a respective incidence angle and represents its respective illuminating different beam intensity value to produce reflected beam segments (A', B', C', . . . ) each having a reflection angle ($\alpha'$) that is equal to said incidence angle of the corresponding illuminating beam segment (A, B, C, . . . );

(d) sensing or scanning said reflected beam segments (A', B', C', . . . ) to provide reflected different intensity values;

(e) correlating said illuminating different beam intensity values of said illuminating beam segments (A, B, C, . . . ), with reflected beam intensity values of said reflected beam segments (A', B', C', . . . ) to provide correlated values (A, A'; B, B'; C, C'; . . . ); and (f) processing said correlated values with the aid of a computer program for ascertaining said curvature.

2. The method of claim 1, wherein said step of correlating is performed by correlating said incidence angles of said marked illuminating beam segments (A, B, C, ...) with said reflection angles of said reflected laser beam segments (A', B', C', ...).

3. The method of claim 1, wherein said step of sensing or scanning is performed by simultaneously sensing all reflected beam segments (A', B', C', ...) along a common line and providing relative movement between said metal edge profile and a scanning head, so that said scanning is performed in a line-by-line manner.

4. The method of claim 1, wherein said step of intensity modulating said parallel beam segments for marking comprises varying said illuminating beam intensity values by passing said beam (4') with its parallel beam segments through a radiation intensity matrix (5) and forming an interference between two beam segments emitting coherent light.

5. The method of claim 1, wherein said step of intensity modulating said parallel beam segments for marking comprises varying said illuminating beam intensity values by adjusting intensity values of said illuminating beam segments so that intensities rise or fall in a direction that extends perpendicularly or at an angle relative to a longitudinal light beam axis.

6. The method of claim 1, wherein said step of intensity modulating said parallel beam segments for marking comprises varying said radiation intensity by modulating said light beam intensity of said illuminating light beam in accordance with a sinusoidal function.

7. The method of claim 1, wherein said step of processing comprises using a phase shifting algorithm as a basis for said computer program.

8. The method of claim 1, wherein said step of sensing or scanning comprises using a scanning head (SH) having light conductor fibers arranged in at least one row or array connected to photosensitive sensors (S), and positioning said row or array relative to said metal edge profile so that said reflected beam segments (A', B', C', ...) enter into a respective light conductor fiber end (6A, 6B, 6C, ...) for transmission into a respective photosensitive sensor, said row or array of light conductor fibers permitting said simultaneous sensing of all reflected beam segments (A', B', C', ...) in a line.

9. The method of claim 1, wherein said step of sensing or scanning is performed by shifting said metal edge profile relative to a stationary sensing head.

10. The method of claim 1, wherein said step of sensing or scanning is performed by keeping said metal edge profile stationary and shifting a scanning head (SH) along said metal edge profile.

11. The method of claim 10, comprising incorporating into said scanning head (SH) at least one radiation intensity matrix for said intensity modulating step, and photosensitive sensors (S) for said scanning.

12. The method of claim 8, wherein said step of sensing or scanning is performed by providing a stepwise relative movement between said metal edge profile and said at least one row or array of light conductor fiber ends (6, 6A, 6B, 6C, ...) so that all photosensitive sensors of a row or array sense in each step along a line on said metal edge profile and all sensing or scanning steps result in a line-by-line sensing.

13. The method of claim 1, wherein said correlating is performed with reference to said incidence angle ($\alpha$) of said marked illuminating beam segments (A, B, C, ...), and with reference to said reflection angle ($\alpha'$) of said reflected beam segments (A', B', C', ...).

14. The method of claim 1, wherein said single light beam is generated as a single laser light beam.

* * * * *

UNITED STATES PATENT AND TRADEMARK OFFICE
CERTIFICATE OF CORRECTION

PATENT NO. : 5,570,186
DATED : October 29, 1996
INVENTOR(S) : Satzger et al.

It is certified that error appears in the above-indentified patent and that said Letters Patent is hereby corrected as shown below:

Title Page:
[54] line 2, after "SUCH" insert --AS--;
[63] line 1, delete "Pat.";
    line 2, replace "5,444,536." by --now abandoned.--.
Col. 1, line 2, after "SUCH" insert --AS--.
Col. 3, line 26, replace "Calculated" by --calculated--.
Col. 5, line 51, delete "the laser beam segments";
    line 52, after "intensity" insert --of the laser beam segments--.
Col. 7, line 27, replace "position 3" by --portion 3--.
Col. 12, line 20, after "matrix" insert --(5)--.

Signed and Sealed this

Fourth Day of February, 1997

Attest:

BRUCE LEHMAN

Attesting Officer      Commissioner of Patents and Trademarks